US009277001B2

(12) United States Patent
Ashok et al.

(10) Patent No.: US 9,277,001 B2
(45) Date of Patent: *Mar. 1, 2016

(54) DETERMINING LOCATION OF HARDWARE COMPONENTS IN A CLOUD COMPUTING ENVIRONMENT BASED ON HARDWARE COMPONENTS SELF-LOCATING OTHER HARDWARE COMPONENTS

(71) Applicant: International Business Machines Corporation, Armonk, NY (US)

(72) Inventors: Rohith K. Ashok, Apex, NC (US); Roy F. Brabson, Raleigh, NC (US); Hugh E. Hockett, Raleigh, NC (US); Matt R. Hogstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/919,551

(22) Filed: Jun. 17, 2013

(65) Prior Publication Data

US 2014/0372497 A1    Dec. 18, 2014

(51) Int. Cl.
*H04L 29/08*    (2006.01)

(52) U.S. Cl.
CPC ............ *H04L 67/1002* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 8,171,142 B2 | 5/2012 | Kolin et al. | |
| 2005/0228618 A1* | 10/2005 | Patel et al. | 702/188 |
| 2010/0023614 A1* | 1/2010 | Lewis et al. | 709/224 |
| 2011/0183615 A1 | 7/2011 | Castaneda et al. | |
| 2011/0185091 A1 | 7/2011 | Rofougaran et al. | |
| 2011/0191454 A1* | 8/2011 | Joukov | 709/223 |
| 2011/0241833 A1 | 10/2011 | Martin et al. | |
| 2012/0005344 A1 | 1/2012 | Kolin et al. | |
| 2012/0039612 A1 | 2/2012 | Piazza | |

OTHER PUBLICATIONS

Mell et al., "The NIST Definition of Cloud Computing," Special Publication 800-145, Sep. 2011.
Interlink Networks, "A Practical Approach to Identifying and Tracking Unauthorized 802.11 Cards and Access Points," 2002.
IBM, "Server Chassis/Rack Thermal/Mechanical Solution," http://www.ip.com/pubview/IPCOM000012060D, Apr. 4, 2003.

(Continued)

*Primary Examiner* — James A Thompson
(74) *Attorney, Agent, or Firm* — Robert A. Voigt, Jr.; Winstead, P.C.

(57) ABSTRACT

A method, system and computer program product for managing hardware components in a cloud computing environment. Each hardware component in a data center of the cloud computing environment detects and identifies other hardware components within a communication range of the hardware component using a wireless protocol. Furthermore, each hardware component determines its actual location as well as its relative location with respect to the detected hardware components, such as based on a triangulation of the wireless signals. Such information is transmitted to an administrative server. An inventory of the hardware components in the data center, including their current location, is then compiled by the administrative server. In this manner, a hardware component can be more easily located after being relocated in the data center. Furthermore, the administrative server will be able to balance a workload across these hardware components based on their location.

12 Claims, 7 Drawing Sheets

(56) References Cited

OTHER PUBLICATIONS

IBM, "Handheld Dockable Wireless Device for Managing Multiple Blade Enclosures," http://www.ip.com/pubview/IPCOM000160809D, Nov. 29, 2007.

Office Action for U.S. Appl. No. 13/920,187 dated Oct. 8, 2014, pp. 1-13.
Office Action for U.S. Appl. No. 13/920,187 dated Jan. 15, 2015, pp. 1-13.
Office Action for U.S. Appl. No. 13/920,187 dated Apr. 17, 2015, pp. 1-19.

* cited by examiner

DETERMINING LOCATION OF HARDWARE COMPONENTS IN A CLOUD COMPUTING ENVIRONMENT BASED ON HARDWARE COMPONENTS SELF-LOCATING OTHER HARDWARE COMPONENTS

TECHNICAL FIELD

The present invention relates generally to cloud computing, and more particularly to determining the location of hardware components in a cloud computing environment based on hardware components self-locating other hardware components thereby allowing the balancing of a workload across the hardware components based on the location of the hardware components.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The functions of the cloud computing environment are performed by a data center, which includes various types of hardware components (e.g., storage controllers, network switches, physical compute machines). In a large data center, there may be multiple units of the same type of hardware component (e.g., hundreds of the same compute blade). As a result, when a hardware component is relocated from its original location (e.g., relocating a compute blade from one chassis to another chassis on a different rack), it may be difficult to locate that hardware component at its new location, especially in a large data center that may be spread out over a large geographic area. Consequently, a user may end up spending lots of time in attempting to locate the hardware component's new location thereby causing a time consuming and frustrating experience for the user.

BRIEF SUMMARY

In one embodiment of the present invention, a method for managing hardware components in a cloud computing environment comprises receiving location information for the hardware components in a data center of the cloud computing environment from the hardware components, where the location information for each of the hardware components comprises both an actual location and a relative location with respect to one or more other hardware components in the data center. Each of the hardware components is configured to detect one or more other hardware components within a communication range of the hardware component. Furthermore, each of the hardware components is configured to determine its actual location and a relative location with respect to the one or more detected hardware components. The method further comprises receiving identification information of hardware components detected by the hardware components from the hardware components, where each of the hardware components is configured to identify the one or more detected hardware components based on an identification signal received from the one or more detected hardware components. In addition, the method comprises balancing, by a processor, a workload across the hardware components in the data center based on the received identification and location information.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
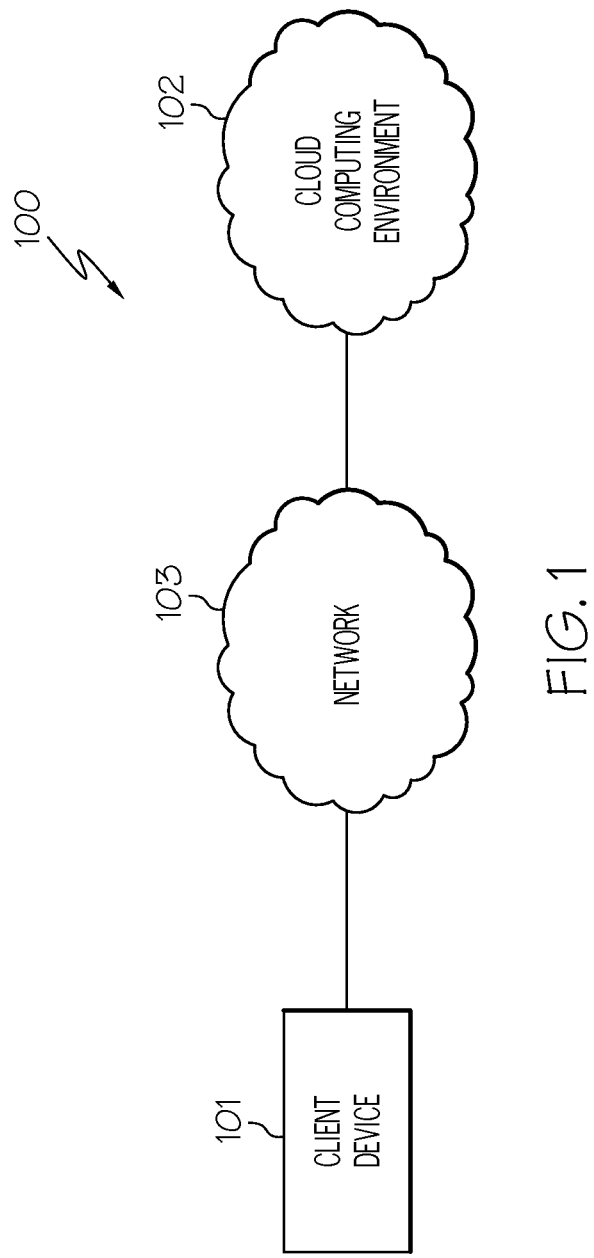
FIG. 1 illustrates a network system configured in accordance with an embodiment of the present invention.

The present invention comprises a method, system and computer program product for managing hardware components in a cloud computing environment. In one embodiment of the present invention, each hardware component in a data center of the cloud computing environment detects other hardware components within a communication range of the hardware component using a wireless protocol, such as radio frequency identification, Bluetooth®, IEEE 802.11 and cellular communications. The hardware component can identify these detected hardware components, such as by receiving an identification signal that contains identification information (e.g., name, type, serial number, etc.) from that hardware component. Furthermore, each hardware component in the data center can determine its actual location and a relative location with respect to the detected hardware components. For example, a hardware component may determine its relative location with respect to the detected hardware components based on a triangulation of the wireless signals. In another example, a hardware component's actual location may be determined based on wireless signals received from devices at fixed locations. In another example, a distance from a hardware component to a detected hardware component may be based on relative signal strength. Each hardware component in the data center may then transmit such identification and location information to an administrative server. By having each hardware component "self-locate" components within their communication range and having those neighboring hardware components locate hardware components within their communication range (which may be outside the range of the first hardware component locating its neighboring hardware components), an overall inventory of the hardware components in the data center can be compiled by the administrative server, including each hardware component's current actual and relative location (relative to other hardware components). In this manner, a hardware component can be more easily located after being relocated in a data center. Since the administrative server has knowledge of the identification and location of the hardware components in the data center, the administrative server will be able to balance a workload across these identified hardware components based on their location. That is, the administrative server will be able to balance a workload across these hardware components in the data center based on location dependent policies (e.g., balancing heat distribution across the data center, consolidating workloads to co-located systems, balancing network hops and available bandwidth across the data center).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
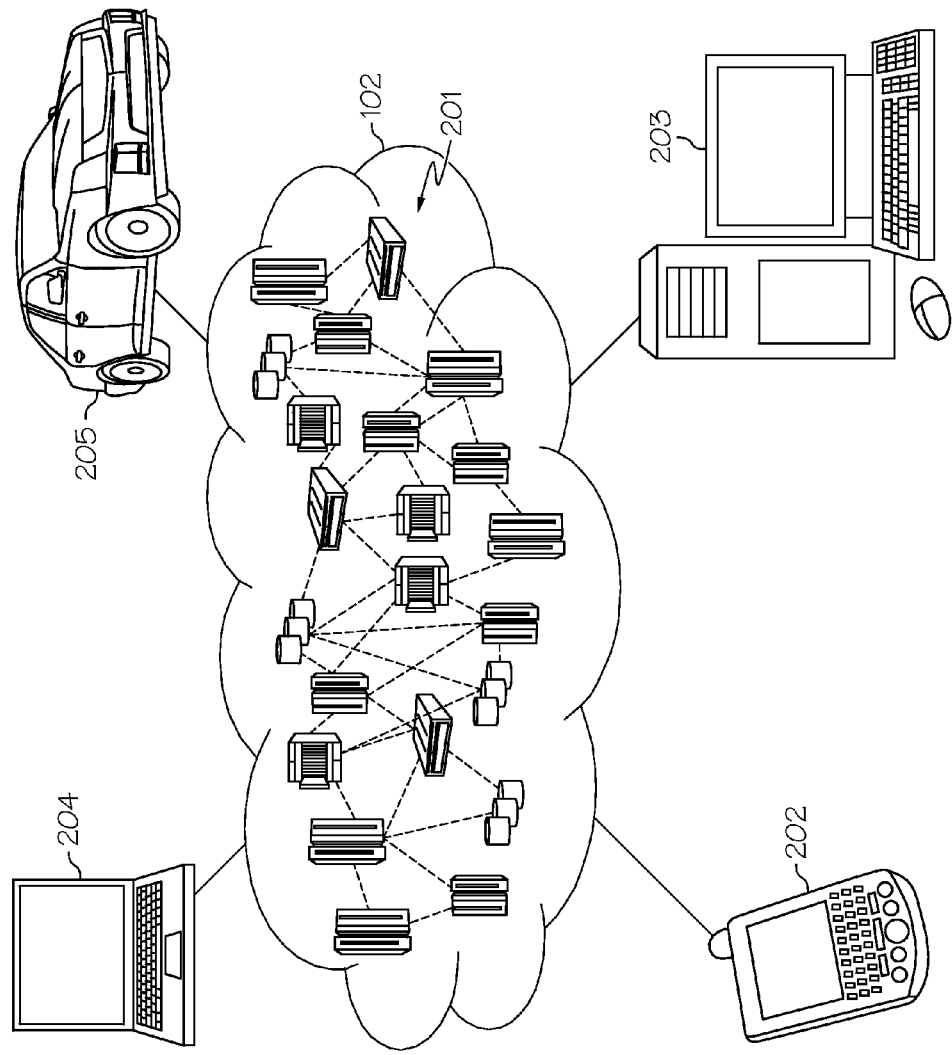
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of exemplary cloud computing nodes 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
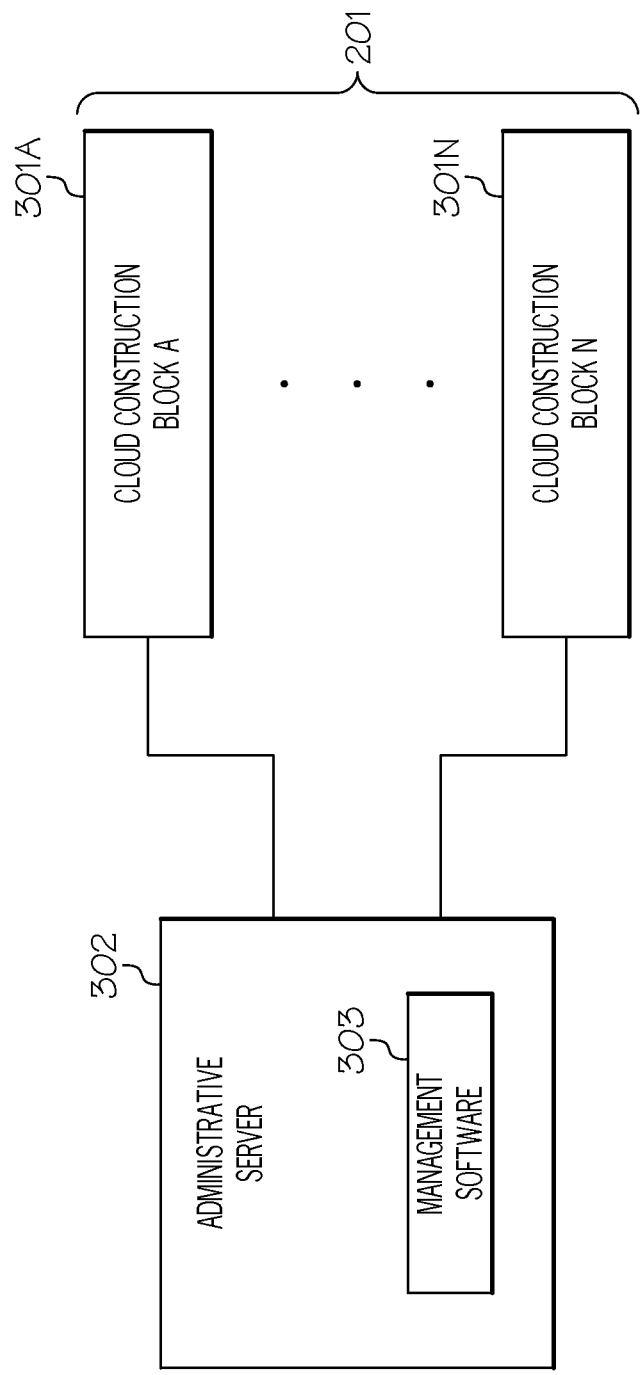
FIG. 3 illustrates a cloud computing node comprised of one or more cloud construction blocks in accordance with an embodiment of the present invention.

Referring now to FIG. 3, FIG. 3 illustrates a schematic of a cloud computing node 201 (FIG. 2) comprised of one or more "cloud construction blocks" 301A-301N in accordance with an embodiment of the present invention. Cloud construction blocks 301A-301N may collectively or individually be referred to as cloud construction blocks 301 or cloud construction block 301, respectively. Each cloud construction block 301 may be represented by a single unit that includes various types of hardware components (e.g., storage controllers, network switches, physical compute machines) as discussed further below in connection with FIG. 4.

Furthermore, as illustrated in FIG. 3, each cloud construction block 301 is connected to an administrative server 302 configured to provide data center-level functions. Administrative server 302 supports a module, referred to herein as the management software 303, that can be used to manage the hardware components of cloud computing nodes 201, monitor system utilization, intelligently deploy images of data and optimize the operations of cloud computing environment 102. Furthermore, management software 303 can be used to manage the hardware components in cloud computing environment 102 by having the hardware components self-locate other hardware components thereby allowing the balancing of a workload across the hardware components based on the location of the hardware components as discussed further below in connection with FIG. 7. A description of the hardware configuration of administrative server 302 is provided further below in connection with FIG. 6.

Figure 4:
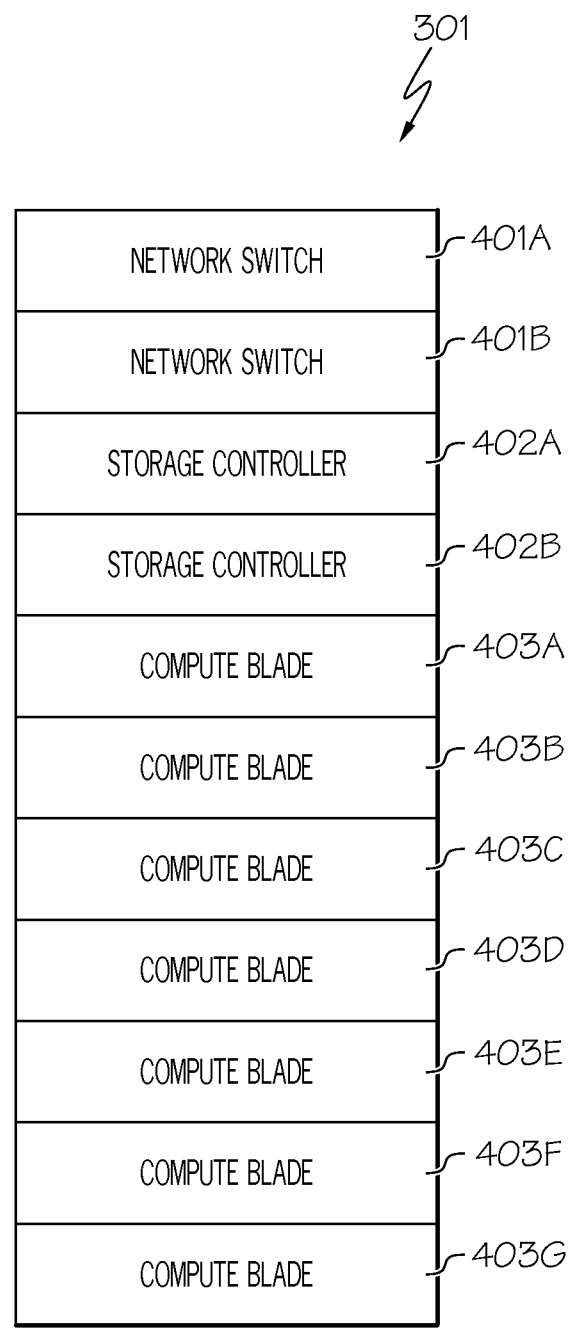
FIG. 4 illustrates a physical layout of a cloud construction block in accordance with an embodiment of the present invention.

Referring now to FIG. 4, FIG. 4 illustrates a physical layout of a cloud construction block 301 (FIG. 3) in accordance with an embodiment of the present invention. Referring to FIG. 4, cloud construction block 301 may comprise a rack of many units containing network hardware (e.g., network switches 401A, 401B), storage hardware (e.g., storage controllers 402A, 402B), and compute hardware (e.g., compute blades 403A-403G). Network switches 401-401B may collectively or individually be referred to as network switches 401 or network switch 401, respectively. Storage controllers 402A-402B may collectively or individually be referred to as storage controllers 402 or storage controller 402, respectively. Compute blades 403A-403G may collectively or individually be referred to as compute blades 403 or compute blade 403, respectively. A virtualization environment for compute blade 403 (e.g., blade server) is discussed further below in connection with FIG. 5.

While FIG. 4 illustrates cloud construction block 301 as comprising a particular number of network switches 401, storage controllers 402 and compute blades 403, cloud construction block 301 is not to be limited in scope to the particular number of components depicted in FIG. 4. Furthermore, cloud construction block 301 may include other components, including software, that were not depicted for ease of understanding the principles of the present invention.

Figure 5:
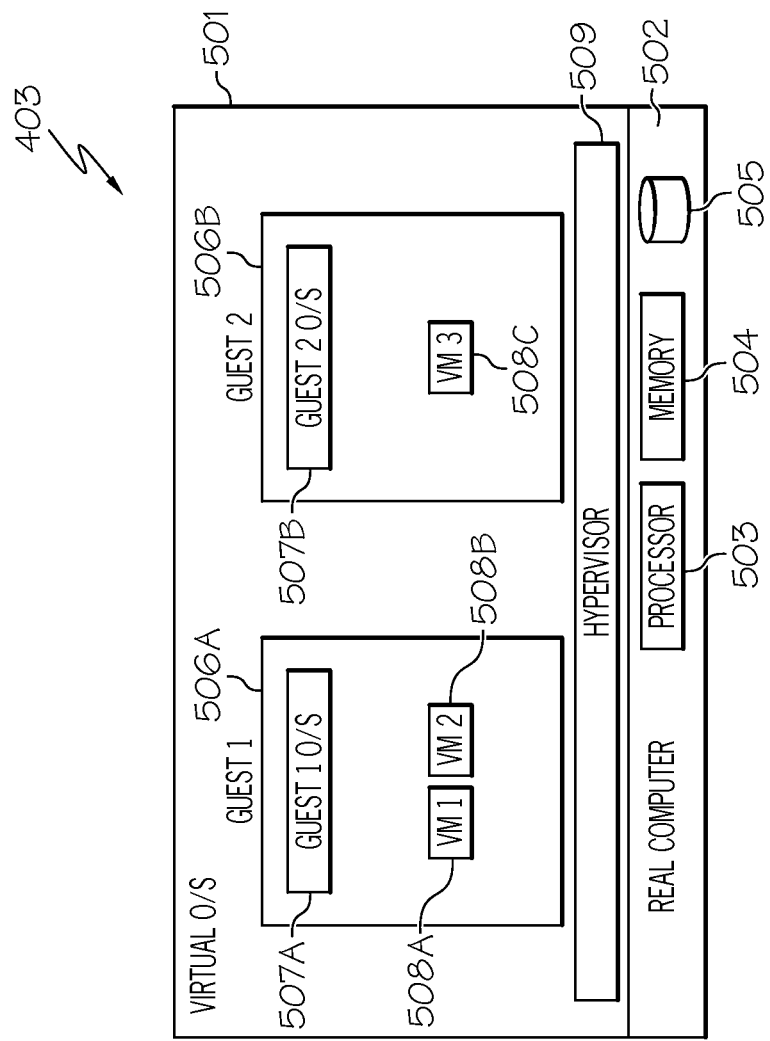
FIG. 5 illustrates a virtualization environment for a compute blade in accordance with an embodiment of the present invention.

Referring now to FIG. 5, FIG. 5 illustrates a virtualization environment for compute blade 403 (FIG. 4) in accordance with an embodiment of the present invention. Compute blade 403 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system.

That is, each guest 506A-506B can be independently reset, host a guest operating system 507A-507B, respectively, (identified as "Guest 1 O/S" and "Guest 2 O/S," respectively, in FIG. 5) and operate with different programs. An operating system or application program running in guest 506A, 506B appears to have access to a full and complete system, but in reality, only a portion of it is available. Guests 506A-506B may collectively or individually be referred to as guests 506 or guest 506, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run on a single host.

As discussed above, virtual operating system 501 and its components execute on physical or real computer 502. These software components may be loaded into memory 504 for execution by processor 503.

The virtualization environment for compute blade 403 is not to be limited in scope to the elements depicted in FIG. 5. The virtualization environment for compute blade 403 may include other components that were not discussed herein for the sake of brevity.

Figure 6:
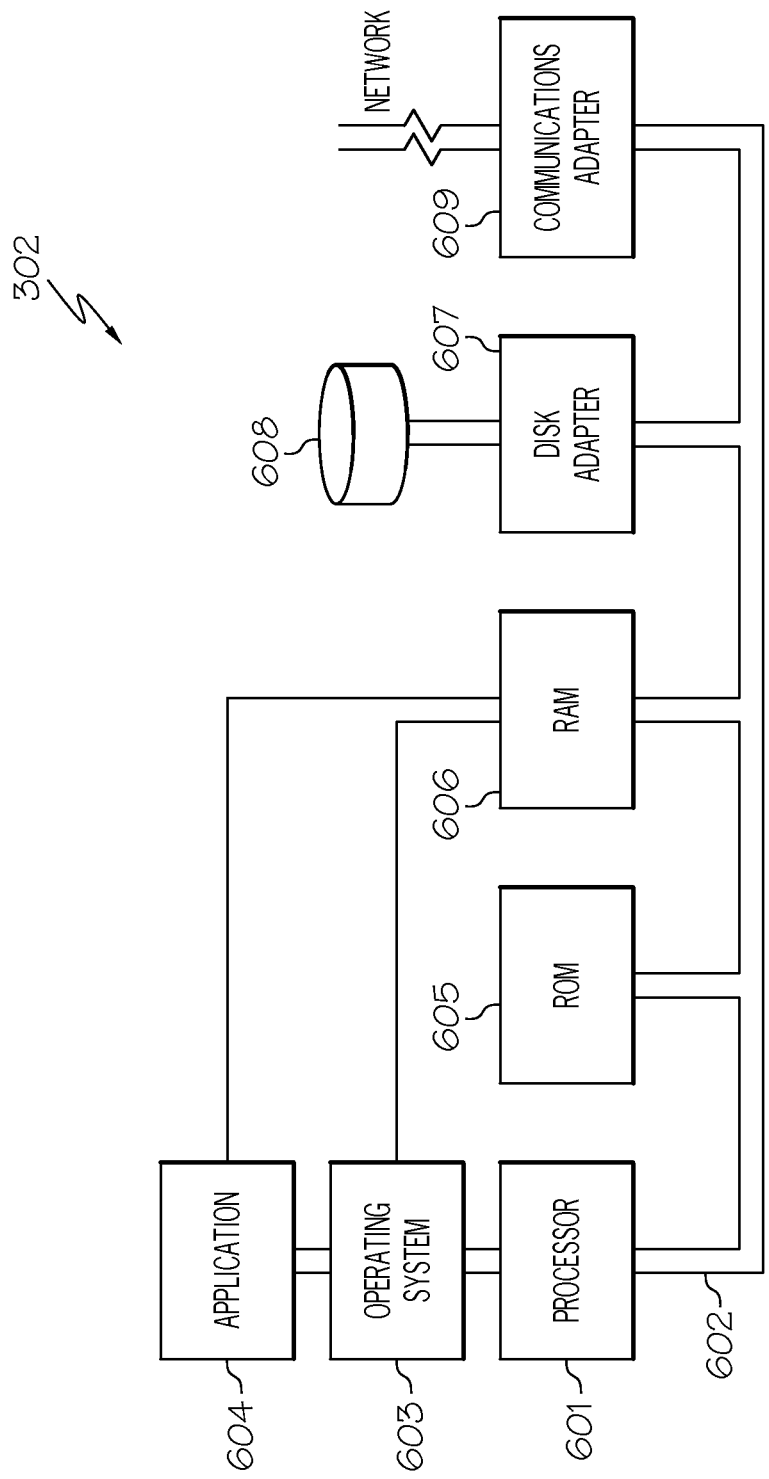
FIG. 6 illustrates a hardware configuration of an administrative server configured in accordance with an embodiment of the present invention.

Referring now to FIG. 6, FIG. 6 illustrates a hardware configuration of administrative server 302 (FIG. 3) which is representative of a hardware environment for practicing the present invention. Administrative server 302 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program for managing the hardware components (e.g., switches 401, storage controllers 402, compute blades 403 of FIG. 4) in cloud computing environment 102 (FIG. 1) by having the hardware components self-locate other hardware components thereby allowing the balancing of a workload across the hardware components based on the location of the hardware components as discussed further below in connection with FIG. 7.

Referring again to FIG. 6, read-only memory ("ROM") 605 is coupled to system bus 602 and includes a basic input/output system ("BIOS") that controls certain basic functions of administrative server 302. Random access memory ("RAM") 606 and disk adapter 607 are also coupled to system bus 602. It should be noted that software components including operating system 603 and application 604 may be loaded into RAM 606, which may be administrative server's 302 main memory for execution. Disk adapter 607 may be an integrated drive electronics ("IDE") adapter that communicates with a disk unit 608, e.g., disk drive. It is noted that the program for managing the hardware components in cloud computing environment 102 by having the hardware components self-locate other hardware components thereby allowing the balancing of a workload across the hardware components based on the location of the hardware components, as discussed further below in connection with FIG. 7, may reside in disk unit 608 or in application 604.

Administrative server 302 may further include a communications adapter 609 coupled to bus 602. Communications adapter 609 interconnects bus 602 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the functions of the cloud computing environment are performed by a data center, which includes various types of hardware components (e.g., storage controllers, network switches, physical compute machines). In a large data center, there may be multiple units of the same type of hardware component (e.g., hundreds of the same compute blade). As a result, when a hardware component is relocated from its original location (e.g., relocating a compute blade from one chassis to another chassis on a different rack), it may be difficult to locate that hardware component at its new location, especially in a large data center that may be spread out over a large geographic area. Consequently, a user may end up spending lots of time in attempting to locate the hardware component's new location thereby causing a time consuming and frustrating experience for the user.

Figure 7:
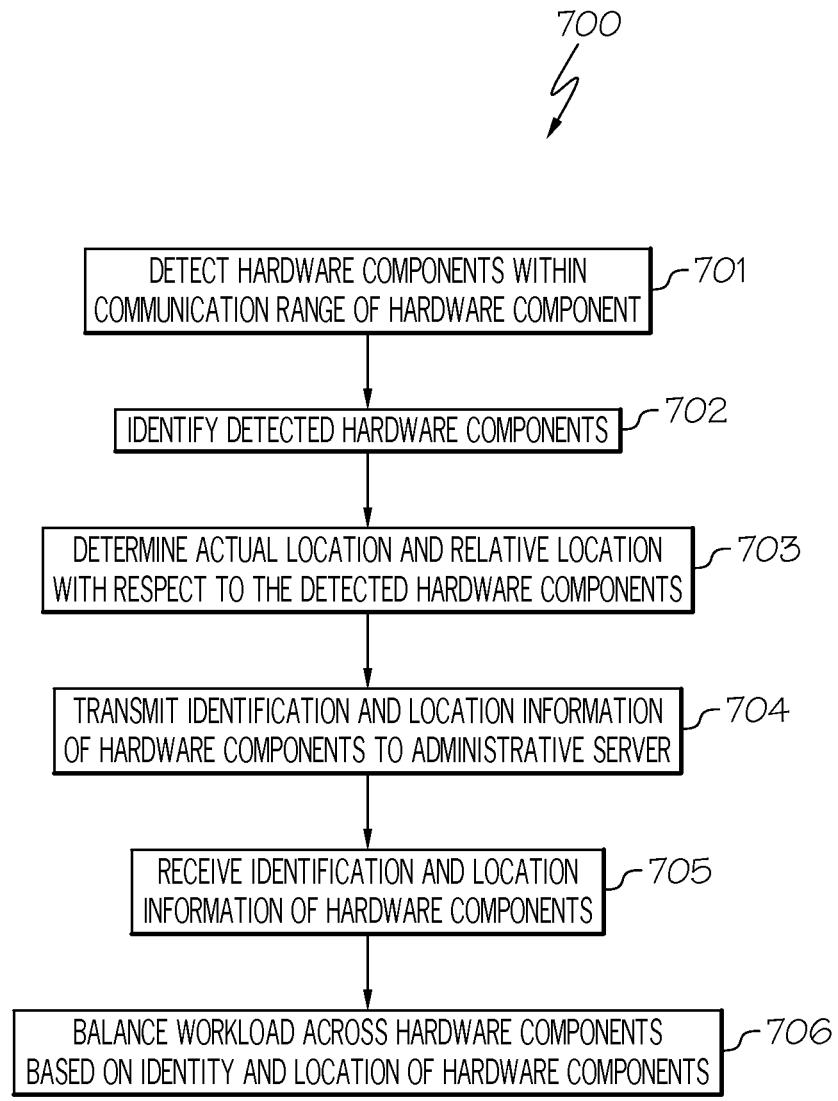
FIG. 7 is a flowchart of a method for having the hardware components self-locate other hardware components thereby allowing the administrative server to have knowledge of the hardware components' current actual and relative location (relative to other hardware components) which may be used by the administrative server to balance a workload across these hardware components in accordance with an embodiment of the present invention.

The principles of the present invention provide a means for enabling a hardware component to be more easily located after being relocated by having the hardware components self-locate other hardware components thereby allowing administrative server 302 (FIGS. 3 and 6) to have knowledge of the hardware components' current actual and relative location (relative to other hardware components) which may be used by administrative server 302 to balance a workload across these hardware components as discussed further below in connection with FIG. 7.

FIG. 7 is a flowchart of a method 700 for having the hardware components (e.g., compute blade 403 of FIG. 4) self-locate other hardware components thereby allowing administrative server 302 (FIGS. 3 and 6) to have knowledge of the hardware components' current actual and relative location (relative to other hardware components) which may be used by administrative server 302 to balance a workload across these hardware components in accordance with an embodiment of the present invention.

Referring to FIG. 7, in conjunction with FIGS. 1-6, in step 701, each hardware component, such as compute blade 403, in a data center of cloud computing environment 102 detects other hardware components within a communication range of the hardware component using a wireless protocol, such as radio frequency identification, Bluetooth®, IEEE 802.11 and cellular communications. In this manner, each hardware component can search for neighboring hardware components. It is noted that each hardware component is not required to use the same wireless protocol as its neighboring hardware components. In some situations, it may be advantageous for the hardware components to use different wireless protocols. For example, radio frequency identification may be used to detect hardware components that are deactivated (i.e., powered off) or used by hardware components that are not able to actively search for neighboring hardware components. Bluetooth® may be used to detect hardware components that are located in close proximity to the detecting hardware component but slightly further away than what is supported by the radio frequency identification tags. The IEEE 802.11 protocol may be used to detect a hardware component that is outside the range of radio frequency identification and Bluetooth®.

In step 702, each hardware component identifies the detected hardware components. In one embodiment, a hardware component can identify a particular hardware component (e.g., a particular type of compute blade 403) by receiving an identification signal that contains identification information (e.g., name, type, serial number, etc.) from that hardware component.

In step 703, each hardware component determines its actual location and a relative location with respect to the detected hardware components. In one embodiment, a hardware component may determine its relative location with respect to the detected hardware components based on a triangulation of wireless signals. In another embodiment, a hardware component's actual location may be determined based on wireless signals received from devices at fixed locations. In another embodiment, a distance from a hardware component to a detected hardware component may be based on relative signal strength.

By having each hardware component "self-locate" components within their communication range and having those neighboring hardware components locate hardware components within their communication range (which may be outside the range of the first hardware component locating its neighboring hardware components), an overall inventory of the hardware components in the data center can be compiled by administrative server 302 as discussed further below. Furthermore, since each hardware component has determined its current location and its relative location to other hardware components (which are identified in step 702), administrative server 302 will have knowledge of each hardware component's current actual and relative location (relative to other hardware components) in the data center as discussed below.

In step 704, each hardware component in the data center transmits the identification and location information obtained in steps 702, 703 to administrative server 302.

In step 705, administrative server 302 receives the identification and location information transmitted by each hardware component in step 704. As a result of each hardware component in the data center transmitting such information to administrative server 302, the overall inventory of the hardware components in the data center can be known by administrative server 302, including each hardware component's current actual and relative location (relative to other hardware components). In this manner, a hardware component can be more easily located after being relocated in a data center.

Since administrative server 302 has knowledge of the identity and location of the hardware components in the data center, administrative server 302 will be able to balance a workload across these hardware components based on their location in step 706. A "workload," as used herein, refers to the amount of processing that a hardware component has been given to do at a given time. In one embodiment, the workload is balanced across the hardware components in the data center based on one or more of the following location based or location dependent policies: balancing heat distribution across the data center, consolidating workloads to co-located systems (e.g., systems located in close proximity to each other), and balancing network hops and available bandwidth across the data center. For example, the policy of balancing heat distribution across the data center involves balancing the thermal output of the hardware components. As a result, the workloads are rebalanced in light of this policy so as to provide optimal heat output or a reduction in the number of "hot areas" that cannot be cooled sufficiently by the cooling systems of the data center. By having knowledge of the identity and location of the hardware components, administrative server 302 will be able to optimally balance the workloads so as to intelligently balance the thermal output of the hardware components. Furthermore, balancing a workload includes balancing a "pattern" of virtual machines used to perform the workload, where the pattern of virtual machines may reside on multiple hardware components. For example, in balancing a workload across the hardware components in the data center, the virtual machines 508 of the "pattern" of the workload (the "pattern" of a workload may refer to the collection of virtual machines 508 on compute blades 403 used to perform the required processing of the workload) may be intelligently balanced based on policies that are location based (e.g., consolidation). By having knowledge of the identity and location of the hardware components in the data center, administrative server 302 will be able to more appropriately balance the pattern of virtual machines 508 (e.g., increase/decrease the number of virtual machines 508 performing the required processing of the workload on a particular compute blade 403 based on the location of compute blade 403 with respect to the location of other compute blades 403 with virtual machines 508 performing the required processing of the workload).

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for managing hardware components in a cloud computing environment, the computer program product comprising the programming instructions for:

receiving location information for said hardware components in a data center of said cloud computing environment from said hardware components, wherein said location information for each of said hardware components comprises both an actual location and a relative location with respect to one or more other hardware components in said data center, wherein each of said hardware components is configured to detect one or more other hardware components within a communication range of said hardware component, wherein each of said hardware components is configured to determine its actual location and a relative location with respect to said one or more detected hardware components;

receiving identification information of hardware components detected by said hardware components from said hardware components, wherein each of said hardware components is configured to identify said one or more detected hardware components based on an identification signal received from said one or more detected hardware components; and balancing a workload across said hardware components in said data center based on said received identification and location information.

2. The computer program product as recited in claim 1, wherein one or more of said hardware components are configured to determine its relative location with respect to its one or more detected hardware components based on a triangulation of wireless signals.

3. The computer program product as recited in claim 1, wherein one or more of said hardware components are configured to determine its actual location based on wireless signals received from devices at fixed locations.

4. The computer program product as recited in claim 1, wherein a distance from a hardware component of said hardware components to a detected hardware component is determined based on relative signal strength.

5. The computer program product as recited in claim 1, wherein each of said hardware components is configured to detect said one or more other hardware components within said communication range of said hardware component using a wireless protocol comprising one or more of the following: radio frequency identification, Bluetooth®, IEEE 802.11 and cellular communications.

6. The computer program product as recited in claim 1, wherein said workload is balanced across said hardware components in said data center based on one or more of the following policies: balancing heat distribution across said data center, consolidating workloads to co-located systems, and balancing network hops and available bandwidth across said data center.

7. A system, comprising:

a memory unit for storing a computer program for managing hardware components in a cloud computing environment; and a processor coupled to said memory unit, wherein said processor, responsive to said computer program, comprises:

circuitry for receiving location information for said hardware components in a data center of said cloud computing environment from said hardware components, wherein said location information for each of said hardware components comprises both an actual location and a relative location with respect to one or more other hardware components in said data center, wherein each of said hardware components is configured to detect one or more other hardware components within a communication range of said hardware component, wherein each of said hardware components is configured to determine its actual location and a relative location with respect to said one or more detected hardware components;

circuitry for receiving identification information of hardware components detected by said hardware components from said hardware components, wherein each of said hardware components is configured to identify said one or more detected hardware components based on an identification signal received from said one or more detected hardware components; and circuitry for balancing a workload across said hardware components in said data center based on said received identification and location information.

8. The system as recited in claim 7, wherein one or more of said hardware components are configured to determine its relative location with respect to its one or more detected hardware components based on a triangulation of wireless signals.

9. The system as recited in claim 7, wherein one or more of said hardware components are configured to determine its actual location based on wireless signals received from devices at fixed locations.

10. The system as recited in claim 7, wherein a distance from a hardware component of said hardware components to a detected hardware component is determined based on relative signal strength.

11. The system as recited in claim 7, wherein each of said hardware components is configured to detect said one or more other hardware components within said communication range of said hardware component using a wireless protocol comprising one or more of the following: radio frequency identification, Bluetooth®, IEEE 802.11 and cellular communications.

12. The system as recited in claim 7, wherein said workload is balanced across said hardware components in said data center based on one or more of the following policies: balancing heat distribution across said data center, consolidating workloads to co-located systems, and balancing network hops and available bandwidth across said data center.

* * * * *